Aug. 6, 1929.

P. J. SIMMEN

AUTOMATIC TRAIN CONTROL

Re. 17,395

3 Sheets-Sheet 1

Original Filed April 10, 1923

INVENTOR
Paul J. Simmen
BY Lyman E. Dodge
ATTORNEY

Aug. 6, 1929. P. J. SIMMEN Re. 17,395

AUTOMATIC TRAIN CONTROL

Original Filed April 10, 1923 3 Sheets-Sheet 2

INVENTOR
Paul J. Simmen
BY
Lyman E. Dodge
ATTORNEY

Aug. 6, 1929. P. J. SIMMEN Re. 17,395

AUTOMATIC TRAIN CONTROL

Original Filed April 10, 1923 3 Sheets-Sheet 3

INVENTOR
Paul J. Simmen
BY
Lyman E. Dodge
ATTORNEY

Reissued Aug. 6, 1929. Re. 17,395

UNITED STATES PATENT OFFICE.

PAUL J. SIMMEN, OF EDEN, NEW YORK.

AUTOMATIC TRAIN CONTROL.

Original No. 1,604,537, dated October 26, 1926, Serial No. 631,096, filed April 10, 1923. Application for reissue filed July 10, 1928. Serial No. 291,556.

This invention relates to train control systems, particularly such systems in which there is a combined automatic and manual control, and more especially such systems in which the progress of trains on the trackway is recorded at a central station.

This invention is an improvement of my invention Serial No. 503,235, filed September 26, 1921.

The improvement consists in providing six signals for the safe and convenient direction of train movements, which signals are under the control of the dispatcher and at the same time, the signals are also controlled by a track circuit.

In the modern operation of railways, it is found desirable to not only provide signals for the safe movement of trains but also to provide signals for use in facilitating the movement of trains. This invention provides for six signals under the control of the dispatcher, two of which may be used for safety and four for facilitating train movements; at the same time the dispatcher's control of the several signals is subject to the automatic control by a track circuit. This invention is particularly adapted to single track railways and in order that the dispatcher may intelligently use the several signals for the safe and quick direction of train movements means are provided to automatically indicate or record at the dispatcher's office the progress of the trains over the trackway.

Other objects and advantages will appear as the description of the invention progresses and the novel features will be particularly pointed out in the appended claims.

In describing the invention in detail, reference is had to the accompanying drawings, wherein I have illustrated a preferred physical embodiment of my invention and wherein like characters of reference designate corresponding parts throughout the several views and in which.

Figure 1:
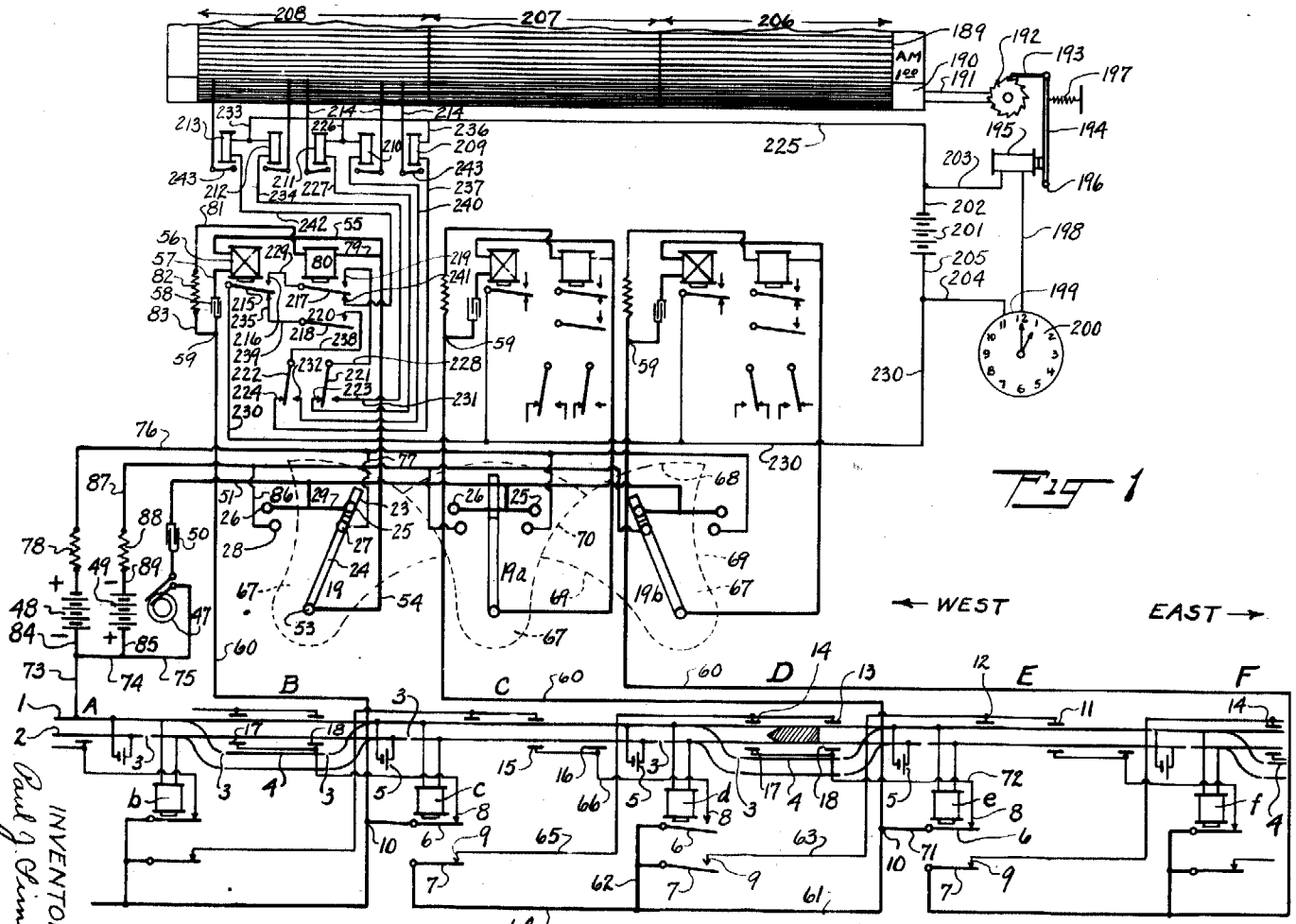
Figure 1 is a schematic representation of the apparatus and circuits in the dispatcher's office and along the track.

Figure 1, shows a track consisting of rails 1 and 2. Rail 1 is electrically continuous and rail 2 is divided into sections by means of insulating joints as 3, thus dividing the track into block sections, as A, B, C, D, E and F. In blocks B, D and F are shown sidings as 4, where trains can meet and pass each other. At the clearance point of the siding, insulating joints, as 3, electrically separate the straight portion of the siding from the main track. A track battery as 5 is located at one end of each block, and track relay as *b*, *c*, *d*, *e* and *f* near the other end of the block, and constitute with their connections to the rails, a track circuit well known to those skilled in the art. Each track relay controls two armatures 6 and 7. When a track relay is energized armature 6 closes front contact as 8 and armature 7 closes front contact as 9; and when a track relay is deenergized front contacts 8 and 9 are broken.

Adjacent to the track are located groups of train control rails as 11 and 12; 13 and 14; 15 and 16; and 17 and 18. Train control rails 11 and 12 govern a westbound movement of a train from block E into block D; train control rails 13 and 14 govern a westbound movement of a train from block D into block C; train control rails 15 and 16 govern an eastbound movement of a train from block C into block D; and train control rails 17 and 18 govern an eastbound movement of a train from block D into block E. Train control rails for westbound movements are on one side of the center line of the track and train control rails for east bound movements are on the other side of the center line of the track; and with this arrangement, the train control rails are always on the right hand side of the direction in which the train in moving.

In each group of train control rails, one is the home train control rail and located near the entrance to a new block, and the other is a distant train control rail located approximately braking distance from the entrance to the new block; thus train control rails 12, 14, 16 and 18 are home train control rails and train control rails 11, 13, 15 and 17 are distant train control rails. These train control rails are of the usual construction, having inclined ends or ramps as shown in my prior Patent No. 1,140,623 granted May 25, 1915, and are so located along the track and insulated from the track that the contact shoe attached to a locomotive or car can make electrical contact with them.

Each group of the four groups of contact rails protecting train movements to and from a siding may be electrically conditioned in six different ways so as to display six different signals on the locomotive or car depending upon the several positions of the manually operated switches in the dispatcher's office as 19, 19[a] and 19[b]. The switches are capable of being placed in six different positions, each position electrically conditioning the train control rails in a different way.

Figure 2:
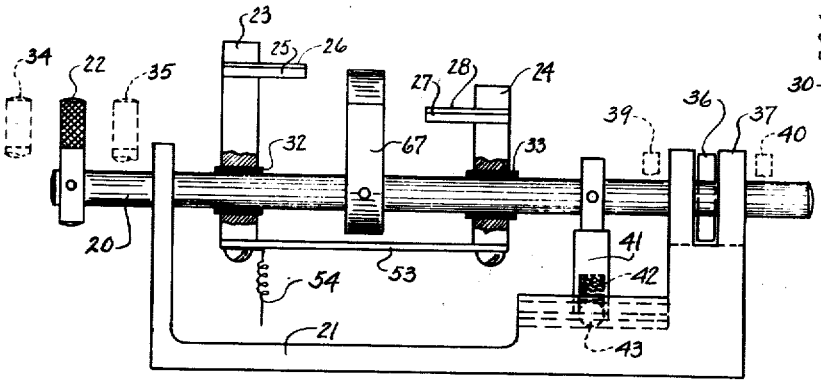
Figure 2 is a side elevation of a switch mechanism by which the dispatcher is enabled to control the signals.
Figure 3:
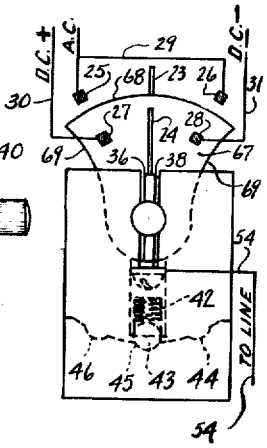
Figure 3 is a rear view of the switch mechanism as shown by Figure 2.

The construction of the manually operated switches 19, 19[a] and 19[b] is shown in Figs. 2 and 3. A shaft as 20 is suitably journalled in a frame 21 in such a manner that shaft 20 may be pulled forward or shoved backward and shaft 20 may be given a rotary motion to the left or the right.

Attached to shaft 20 is a handle 22 by which shaft 20 is placed into its several positions. Also attached to shaft 20 are contact springs 23 and 24, but insulated from the shaft by insulations 32 and 33. In certain positions of shaft 20, contact spring 23 may make electrical contact with terminals 25 or 26 and contact spring 24 may make electrical contact with terminals 25 or 26 and contact spring 24 may make electrical contact with terminals 27 or 28. Terminals 25 and 26 are connected by wire 29 and lead to an alternating current source. Terminal 27 is connected by wire 30 to the positive pole of a direct current source and terminal 28 is connected by wire 31 to the negative pole of a direct current source. By means of handle 22 and its coacting contact springs 23 and 24 shaft 20 may be radially turned to three positions, the left oblique position, as viewed in Fig. 1, as 19[b], the right oblique position as 19, and the vertical position as 19[a], and transversely shaft 20 with its coacting contact springs 23 and 24 may also be placed in three positions, the first position being the one shown in Fig. 2; the second position being when shaft 20 is pulled forward and the handle assumes the dotted position designated as 34; and the third position being, when shaft 20 is pushed backward and the handle assumes the dotted position designated as 35.

When shaft 20 is radially in the right oblique position and transversely in the normal position as shown in Fig. 2, contact spring 23 is in contact with terminal 25, directly connecting it with the alternating current source and contact spring 24 is in contact with terminal 27, connecting it to the positive direct current source. When shaft 20 is radially in the left oblique position and transversely in the normal position as shown in Fig. 2, contact spring 23, is in contact with terminal 26, connecting it with the alternating current source and contact spring 24 is in contact with terminal 28, connecting it to the negative direct current source. When shaft 20 is radially in the vertical position and transversely in the normal position as shown in Fig. 2, contact springs 23 and 24 are disconnected from any current source. This is equally so whether the shaft 20 is transversely in the normal position as shown in Fig. 2 or is in the forward position as indicated at 34 or in the rearward position as shown in 35. When shaft 20 is radially in the right oblique position and transversely in the forward position as shown at 34, contact spring 23 has moved forward sufficiently so that it will not connect with terminal 25, but contact spring 24 is still in contact with terminal 27. When shaft 20 is radially in the left oblique position and transversely in the forward position as shown at 34, contact spring 23 has moved forward sufficiently so that it will not connect with terminal 26, but contact spring 24 is still in contact with terminal 28. When shaft 20 is radially in the right oblique position and transversely in the rearward position as shown at 35, contact spring 23, while having moved rearwardly, still makes contact with terminal 25; but contact spring 24 has moved rearwardly sufficiently so that it will not contact with terminal 27. When shaft 20 is radially in the left oblique position and transversely in the rearward position as shown at 35, contact spring 23, while having moved rearwardly still makes contact with terminal 26, but contact spring 24 has moved rearwardly sufficiently so that it will not make contact with terminal 28.

Near the rear of the shaft 20 is shown an elongated key 36, which is fixed to the shaft in the same parallel plane as handle 22. When shaft 20 is transversely in the normal position as shown in Fig. 2, key 36 may rotate in a slot 37, without hindrance. The slot 37 is cut into the rear standard of frame 21. The rear standard of frame 21 contains also another slot 38, which is vertically cut in the rear standard and parallel to and in line with shaft 20. When it is desired to place shaft 20 transversely in a forward position, handle 22 and key 36 must first be placed in the vertical position before key 36 will permit a forward movement through slot 38. When key 36 assumes the forward position as shown in dotted lines at 39, shaft 20 may be radially turned to any position. When it is desired to place shaft 20 transversely in the rearward position, handle 22 and key 36 must also first be placed in the vertical position before key 36 will permit a rearward movement through slot 38. When key 36 assumes the rearward position as shown in dotted lines at 40, shaft 20 may again be radially turned to any position.

The purpose of key 36 and its cooperating slot 38 is to prevent a transversely forward or rearward movement from the normal position as shown in Fig. 2, without first disconnecting contact springs 23 and 24 from all sources of energy.

Also attached to shaft 20 is a guide member as 41. The lower end of guide member 41 is bored out so as to encase a compression spring, as 42. Beneath the compression spring and also partly encased by the guide member 41, is a ball as 43. Within the path of guide member 41, frame 21 contains three grooves 44, 45 and 46, so positioned that ball 43 will snugly fit into grooves and at the same time compress spring 42. Groove 45 permits a transversely forward or rearward movement of shaft 20, at the same time holding the same radially in the vertical position by reason of the pressure of spring 42. When switch handle 22 is radially placed in the right oblique position, ball 43 will still further compress spring 42 and move into groove 44, thus holding shaft 20 in the right oblique position and when the switch handle is radially placed in the left oblique position, ball 43 still further compresses the spring 42 and moves into groove 46, thus holding shaft 20 in the left oblique position.

The contact springs 23 and 24 at their lower extremity are electrically connected by a connecting bar as 53 to which a wire 54 is electrically connected.

To shaft 20 of each switch 19 is also attached a segment as 67. The segments are conveniently made in the form of a plate bounded by a convex arc 68 and two concave arcs as 69, as shown in Fig. 3, and in dotted lines in Fig. 1. The segments for all the switches as 19 are in the same plane, when shaft 20 is transversely in the normal position as shown in Fig. 2. The shafts 20 of the switch 19 are so spaced that when handle 22 is placed in an oblique position, the convex edge of the segment will slide along and fit snugly to the concave edge of the segment on the adjacent switch, as shown at 70 in Fig. 1. The purpose of these segments is to provide interlocking means between the switches so that when one switch is in a certain position, the adjacent switches are locked against movement in certain radial directions. The segments however, only lock against such radial movements when shaft 20 is in the normal position as shown in Fig. 2 and these segments under certain conditions, will not interlock with the adjacent segments if the adjacent segments are not transversely in the same position. The purpose of these interlocking segments will be described hereinafter.

By means of these several positions of switches 19, 19[a] and 19[b] six different electrical conditions can be established in any of the four groups of train control rails as follows:

*First condition.*—When switch 19 is transversely in the normal position as shown in Fig. 2 and radially in the right oblique position, contact spring 23 makes contact with terminal 25, and contact spring 24 makes contact with terminal 27 and in this position of the switches the four groups of train control rails are charged with alternating current and positive direct current.

*Second condition.*—When switch 19 is transversely in the normal position as shown in Fig. 2 and radially in the left oblique position, contact spring 23 makes contact with terminal 26, and contact spring 24 makes contact with the terminal 28, and in this position of the switch, the four groups of train control rails are charged with alternating current and negative direct current.

*Third condition.*—When switch 19 is transversely in the forward position as shown in dotted line at 34 and radially in the right oblique position, contact spring 23 is disconnected from terminal 25 and in this position of the switch, the four groups of train control rails are charged with positive direct current only.

*Fourth condition.*—When switch is transversely in the forward position as shown in dotted line at 34 and radially in the left oblique position, contact spring 23 is disconnected from either terminal 25 or 26 and contact spring 24 makes contact with terminal 28 and in this position of the switch, the four groups of train control rails are charged with negative direct current only.

*Fifth condition.*—When switch 19 is transversely in the rearward position as shown in dotted lines at 35 and radially in the right or left oblique position, contact spring 23 makes contact with terminals 25 or 26, but contact spring 24 is disconnected from either terminal 27 or 28, and in this position of the switch, the four groups of train control rails are charged with alternating current only.

*Sixth condition.*—When switch 19 is transversely in any of the three positions, the normal as shown in Fig. 2; or forward as shown at 34; or the rearward as shown at 35; and radially in the vertical position, contact spring 23 is disconnected from either terminal 25 or 26 and contact spring 24 is also disconnected from either terminal 27 or 28, and in this position of the contact springs, the four groups of train control rails are de-energized.

The six electrical conditions of train control rails are transmitted to the locomotive of the train thereby displaying six different signals in a manner to be described hereinafter.

I will now describe the necessary three control circuits by which the train control rails are charged with electrical energy to produce the first five above enumerated conditions, from electrical sources as 47, 48 and 49 in the dispatcher's office.

First: The alternating current control circuit is as follows; from alternating current source 47, condenser 50, bus 51, wire 29, terminal 25 or 26, contact spring 23, connecting bar 53, wires 54 and 55, alternating current relay 56, wire 57, condenser terminal 58, wire 59, line wire 60, to terminal 10 along the track, and thence from terminal 10 to train control rails 11 and 12 through the following branch circuit; wires 61 and 62, armature 7 of track relay D, front contact 9, wire 63 to train control rails 11 and 12. A similar branch circuit is established from alternating current source 47 to train control rails 13 and 14 through second branch circuit as follows: terminal 10, wires 61 and 64, armature 7 of track relay C, front contact 9, wire 65, to train control rails 13 and 14. A similar circuit is established from alternating current source 47 to train control rails 15 and 16 through third branch circuit as follows: terminal 10, wires 61 and 62, armature 6 of track relay D, front contact 8, wire 66, to train control rails 15 and 16. A similar circuit is established from alternating current source 47 to train control rails 17 and 18 through fourth branch circuit as follows: terminal 10, wire 71, armature 6 of track relay E, front contact 8, wire 72, to train control rails 17 and 18. From the several train control rails the alternating current circuit is completed through cab circuit on the locomotive, to be described hereinafter, to track rail 1 and thence through wires 73, 74 and 75 to alternating current source 47.

Second: The positive direct current control circuit is as follows: from positive pole of battery 48 in the dispatcher's office, impedance coil 78, bus 76, wire 77, terminal 27, contact spring 24, connecting bar 53, wires 54 and 79, polarized relay 80, wire 81, impedance coil 82, wire 83, terminal 59, line wire 60, terminal 10, wires 61 and 62, armature 7 of track relay D, front contact 9, wire 63, to train control rails 11 and 12, and thence through a cab circuit on the locomotive, to be described hereinafter, to track rail 1 and thence through wires 73 and 84 to the negative pole of battery 48. A similar circuit is closed to the other three groups of train control rails through the several branch circuits hereinbefore described.

Third: The negative direct current control circuit is as follows: from positive pole of battery 49 in the dispatcher's office, wires 85, 74 and 73, to track rail 1 and thence through a cab circuit on the locomotive, to be described hereinafter, to train control rails 11 or 12 and thence wire 63, front contact 9, armature 7 of track relay D, wires 62 and 61, terminal 10, line wire 60, terminal 59, wire 83, impedance coil 82, wire 81, polarized relay 80, wires 79 and 54, connecting bar 53, contact spring 24, terminal 28, wire 86, bus 87, impedance coil 88, wire 89, to the negative pole of battery 49. A similar circuit is closed to the other three groups of train control rails through several branch circuits hereinbefore described.

Impedance coils 78, 82 and 88 are inserted in the two direct current circuits to stop the flow of alternating current and condensers 50 and 58 are inserted in the alternating current circuit to stop the flow of direct current.

Alternating current relay 56, and polarized relay 80 are inserted in the above described circuits for the purpose of recording train movements, and their use and operation will be described hereinafter.

It will thus be seen that when switch 19 is placed in any one of its six different positions, thereby connecting or disconnecting the three electrical sources in the dispatcher's office 47, 48 or 49, the four groups of train control rails guarding the movement of trains to and from the siding are electrically conditioned in six different ways, corresponding to the six different conditions hereinbefore described.

Any one of the first five electrical conditions of the train control rails is made inoperative, however, if there is a train in the block ahead, for the reason that any one of the three hereinbefore described control circuits is broken through the track relay of the block so occupied. For instance if there is a train in block D, as shown in hatched lines, current from track battery 5 of block D is short circuited through the wheels and axles of the train, in a manner well known to those skilled in the art, which results in armatures 6 and 7 of track relay D dropping away from front contacts 8 and 9, thus breaking the circuit to train control rails 11 and 12 and 15 and 16. Thus when block D is occupied, westbound train control rails 11 and 12, guarding the entrance into block D are denergized, corresponding to the six of the hereinbefore described electrical conditions; and eastbound train control rails 15 and 16, guarding the entrance to block D from the other direction, are also deenergized, thus breaking the circuit to train control rails 13 and 14 and 17 and 18, which are guarding the entrance to block C from either direction.

I will now describe the apparatus and circuits on the locomotive or car.

Figure 4:
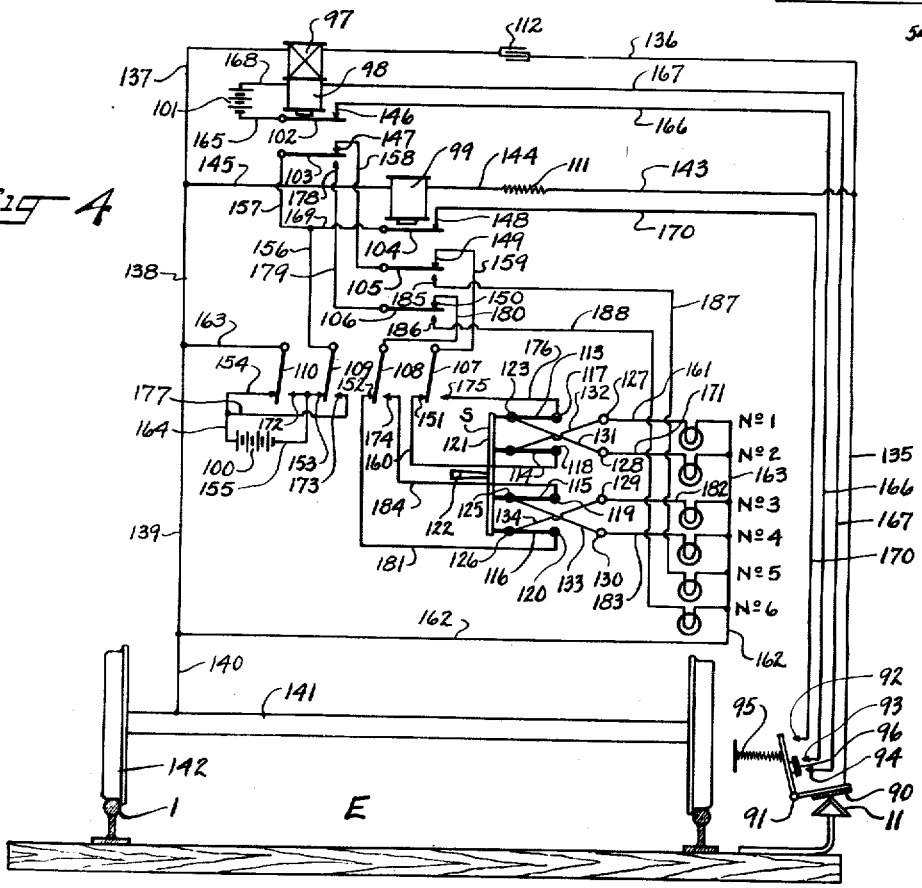
Figure 4 is a schematic representation of the apparatus and circuits on the locomotive or car, which with certain cooperating parts of Figure 1 display six signals on the locomotive or car, when a locomotive or car is moving in one direction over the division.
Figure 5:
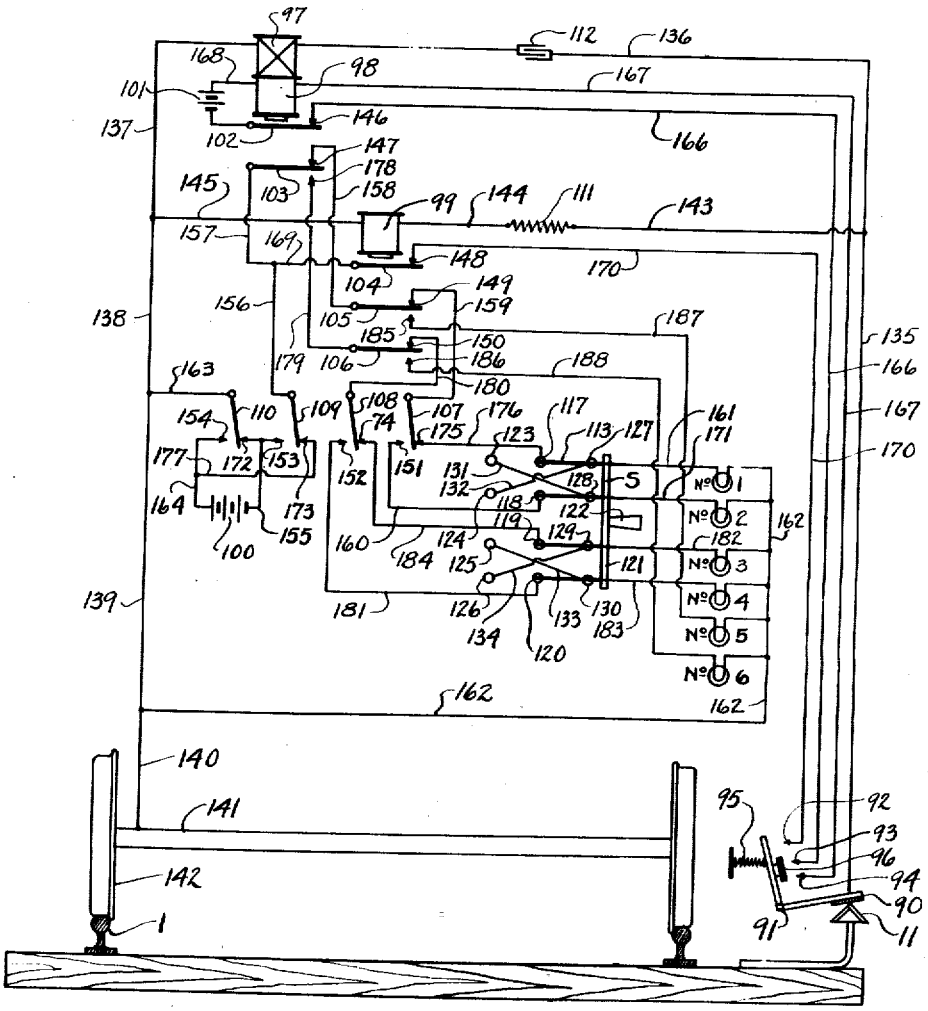
Figure 5 shows the apparatus and circuits on the locomotive or car, when it is moving in the other direction over the division.

There are six instrumentalities on each locomotive or car designated as No. 1, No. 2, No. 3, No. 4, No. 5 and No. 6, as shown in Figs. 4 and 5. While these are shown as lamps, they may equally as well represent any electro-magnetic device to which motion is given, depending upon whether the circuit is energized or deenergized. Such electro-magnetic devices may be used for other purposes than or in addition to the display of signals to the engineer, such, as is well known in the art, the proper control of speed control devices or electro-pneumatic air valves or both. Fig. 4 shows the apparatus and circuits on the locomotive traveling eastward over the division, and Fig. 5 shows the apparatus and circuits on a locomotive traveling westward over the division. The difference between an eastbound and a westbound locomotive consists in transposing certain circuits by means of a four-pole, double-throw switch designated as S. Switch S on an eastbound locomotive is in the lefthand position as shown in Fig. 4; and switch S on a westbound locomotive, is in the right hand position as shown in Fig. 5. The object of differentiating the circuits on an eastbound and a westbound train is for the purpose of directional control, similar to my application for reissue, Serial No. 229,234, filed Oct. 27, 1927, so that when the westbound train control rails 11 and 12 and 13 and 14 at block D are electrically conditioned to give a clear signal to a westbound train the eastbound train control rails 15 and 16 and 17 and 18 at blocks B and D are electrically conditioned to give a stop signal to an east bound train by reason of the interlocking features of the segment 67 operated by a switch 19 in the dispatcher's office, as will be fully described hereinafter.

By reason of the position of switch S being in the left hand position on an eastbound locomotive, and in the right hand position on a westbound locomotive, when a locomotive is passing a train control rail, which is energized with alternating current and positive direct current, No. 1 signal will be displayed on an eastbound locomotive but No. 2 signal will be displayed on a westbound locomotive. When a locomotive is passing a train control rail which is energized with alternating current, and negative direct current, No. 2 signal will be displayed on an eastbound locomotive. When a locomotive is passing a train control rail which is energized with positive direct current only, No. 3 signal will be displayed on an eastbound locomotive but No. 4 signal will be displayed on a westbound locomotive. When a locomotive is passing a train control rail which is energized with negative direct current only, No. 3 signal will be displayed on a westbound locomotive and No. 4 on an eastbound locomotive. Since the position of switch S transposes the circuits passing through signals No. 1, No. 2, No. 3 and No. 4 only, signals No. 5 and 6 are not affected by the position of switch S, and therefore when a locomotive is passing a train control rail which is energized with alternating current only, signal No. 5 will be displayed on both an eastbound and westbound locomotive, and when a locomotive is passing a train control rail which is deenergized, signal No. 6 will be displayed on both an eastbound and westbound locomotive.

Signals No. 1 and No. 6 may be termed safety signals for the purpose of directing the safe movement of trains and signals No. 2, No. 3, No. 5 may be termed facility signals for the purpose of not only directing the movements of trains safely but with facility. Thus signal No. 1 may indicate to the engineer to proceed, that the track is clear; signal No. 2 to stop, that the track section ahead is set up for a proceed movement in the opposite direction; signal No. 3 to stop at the next siding and occupy the main track for the purpose of passing another train; signal No. 4 to stop at the next siding and pull in on the siding for the purpose of passing another train; signal No. 5 to stop and report to the dispatcher for instructions; and signal No. 6 to stop as the block ahead is occupied; or the six enumerated signals may be used for any purpose the executive officers of the railway may designate.

The cab apparatus and cab circuits capable of displaying six different signals corresponding to the six different electrical conditions at the train control rails as hereinbefore enumerated and shown in Figs. 4 and 5 are similar to the apparatus and circuits shown in my prior Patent No. 1,399,027 granted December 6, 1921, except that the four-pole, double-throw switch has been added.

In Figs. 4 and 5 is shown an electrical contact shoe as 90, so positioned on the locomotive so as to make contact with train control rail 11. The contact shoe is hinged at 91. The train control rails are inclined at the end so as to form a ramp in the usual manner such as is shown in my prior Patent No. 1,140,623, granted May 25, 1915. When the contact shoe slides along this ramp, the shoe is tilted so as to break contacts 92, 93 and 94. This motion of the shoe compresses spring 95. When the contact shoe leaves the other end of the train control rail, spring 95 forces the contact shoe to the normal position, thus again closing contacts 92, 93 and 94. A metallic plate as 96, fixed to contact shoe 90, but insulated therefrom, is so positioned as to make contact with contacts 93 and 94.

The locomotive also carries an alternating current relay 97, with its companion direct current winding 98; a polarized relay 99; a battery 100; and another battery 101. Alternating current relay 97 and its companion direct current coil 98 control the position of the armatures 102 and 103. Polarized relay 99 controls the position of neutral armatures 104, 105 and 106 and polarized armatures 107, 108, 109 and 110. Polarized armatures 109 and 110 are pole changing members of a switch for the purpose of changing the flow of current from battery 100. An impedance coil 111 is inserted in the circuit through polarized relay 99 to prevent the flow of alternating current in the circuit and a condenser 112 is inserted in the circuit through polarized relay 97 to prevent the flow of direct current through the circuit.

Armature 102 of relay 97 controls a stick circuit through coil 98 which will be described hereinafter and armature 104 of relay 99 controls a second stick circuit for relay 99 which will also be described hereinafter. The four-pole, double throw switch S consists of four pole members 113, 114, 115 and 116 hinged respectively at 117, 118, 119 and 120. The other ends of these four pole members are connected by an insulating bar 121 to which is attached a handle 122. In the left hand position of switch S as shown in Fig. 4, normal for an eastbound train movement, pole members 113, 114, 115 and 116 make contact with terminals 123, 124, 125 and 126, respectively, and when switch S is in the right hand position as shown in Fig. 5 normal for a westbound train movement, pole members 113, 114, 115 and 116 make contact with terminals 127, 128, 129 and 130, respectively. Terminals 123 and 128 are connected by wire 131. Terminals 124 and 127 are connected by wire 132. Terminals 125 and 130 are connected by wire 133, and terminals 126 and 129 are connected by wire 134.

I will now describe the operation of the six different signals on the locomotive in response to the six different electrical conditions of the train control rails as hereinbefore described.

*First condition.*—When switch S is in the left hand position, normal for an eastbound train movement; and the locomotive is passing a train control rail which is energized with alternating current and positive direct current, alternating current will flow from contact shoe 90 wires 135 and 136, condenser 112, alternating current relay 97, wires 137, 138, 139 and 140, axle 142, to track rail 1 and thence the circuit is completed through alternating current control circuit as hereinbefore described. Direct current will also flow from train control rail as follows: contact shoe 90, wires 135 and 143, impedence coil 111, wire 144, polarized relay 99, wires 145, 138, 139 and 140, axle 141, wheel 142, to track rail 1 and thence the circuit is completed through the positive direct control circuit as hereinbefore described. This will result in armatures 102 and 103 of relay 97 making contact with their respective front contacts 146 and 147 and neutral armatures 104, 105 and 106 of relay 99 making contact with their respective front contacts 148, 149 and 150 and polarized armatures 107, 108, 109 and 110 making contact with their respective contacts 151, 152, 153 and 154. In these positions of the armatures, a circuit is established through signal No. 1 as follows: positive pole of battery 100, wire 155, contact 153, polarized armature 109, wires 156 and 157, armature 103, front contact 147, wires 158, armature 105, wire 159, polarized armature 107, contact 151, wire 160, hinge 118, pole member 114, terminal 124, wire 132, terminal 127, wire 161, signal No. 1, wires 162, 139 and 163, polarized armature 110, contact 154, and wire 164 to the opposite pole of battery 100.

As the contact shoe 90 leaves the other end of the train control rail, the position of the armatures of relay 97 and 99 are maintained in the same position after the electromotive forces from the dispatcher's office cease to influence them through two stick circuits. After contact shoe 90 has left the train control rail, spring 95 closes contacts 92, 93 and 94 and a stick circuit is established through coil 98 as follows: from positive pole of battery 101, wire 165, armature 102, front contact 146, wire 166, contact 93, metallic plate 96, contact 94, wire 167, coil 98, wire 168, to the other pole of battery 101. This stick circuit will be hereinafter referred to as the alternating current relay stick circuit.

A second stick circuit is established through relay 99 as follows: from positive pole of battery 100, wire 155, polarized armature 109, wires 156 and 169, armature 104, front contact 148, wire 170, contact 92, shoe 90, wires 135 and 143, impedance coil 111, wire 144, polarized relay 99, wires 145, 138 and 163, polarized armature 110, contact 154, wire 164, to the opposite pole of battery 100. This stick circuit will be referred to hereinafter as the positive polarized relay stick circuit.

It will thus be seen that by reason of the two stick circuits just described, the armatures of relays 97 and 99 are continued in the same position, thus continuing the display of signal No. 1, until the next train control rail is encountered.

Still speaking of the first condition of a train control rail, that is when it is energized with alternating current and positive direct current, but assuming that switch S is in the right hand position, that is normal for a westbound train, alternating current relay 97 will be energized and polarized relay 99 will be positively energized, thus leaving the armatures of the two relays in the same position as heretofore described but by reason of switch S being in the right hand position as shown in Fig. 5, a circuit through signal No. 2 is established instead of through signal No. 1 as follows: from positive pole of battery 100, wire 155, contact 153, polarized armature 109, wires 156 and 157, armature 103, front contact 147, wire 158, armature 105, front contact 149, wire 159, polarized armature 107, contact 151, wire 150, hinge 118, pole member 114, terminal 128, wire 171, signal No. 2, wires 162, 139 and 163, polarized armature 110, contact 154, and wire 164 to the other pole of battery 110.

As the contact shoe 90 leaves the other end of the train control rail, the position of the armatures of relay 97 and 99 are maintained in the same position, since the two stick circuits, the alternating current relay stick circuit, and the positive polarized relay stick circuit, as hereinbefore described, are still effective, and signal No. 2 will be continued.

*Second condition.*—When switch S is in the left hand position, normal for an eastbound train movement, and the locomotive is passing a train control rail which is energized with alternating current and negative direct current, alternating current will flow through relay 97 as hereinbefore described and polarized relay 99 will be negatively energized through a circuit as follows: from track rail 1, wheel 142, axle 141, wires 140, 139, 138 and 145, polarized relay 99, wire 144, impedance coil 111, wires 143 and 135, shoe 90, to train control rail and thence the circuit is completed through the negative direct current control circuit as hereinbefore described. This will result in armatures 102 and 103 of relay 97 making contact with their respective front contacts 146 and 147 and neutral armatures 104, 105, and 106 of relay 99 making contact with their respective front contracts 148, 149 and 150 but polarized armatures 107, 108, 109 and 110 will assume the right hand positions as shown in Fig. 5 and will make contact with their contacts 172, 173, 174 and 175. In these positions of the armatures a circuit is established through signal No. 2 as follows: positive pole of battery 100, wire 155, contact 172, polarized armature 110, wires 163, 139, 162, signal No. 2, wires 171, and 131, terminal 123, pole member 113, hinge 117, wire 176, contact 175, polarized armature 107, wire 159, front contact 149, armature 105, wire 158, front contact 147, armature 103, wires 157 and 156, polarized armature 109, contact 73, wires 177 and 164, to the opposite pole of battery 100.

When the contact shoe leaves the other end of train control rail, the position of the armatures of relays 97 and 99 are maintained in the same position, by reason of the alternating current relay stick circuit being still effective as hereinbefore described, and the negative polarized relay stick circuit is established as follows: from positive pole of battery 100, wire 155, contact 172, polarized armature 110, wires 163, 138 and 145, polarized relay 99, wire 144, impedance coil 111, wires 143, and 135, contact shoe contact 92, wire 170, front contact 148, armature 104, wires 169 and 156, polarized armature 109, contact 173, wire 177, and wire 164 to the other pole of battery 100. This particular stick circuit will be referred to hereinafter as the negative polarized relay stick circuit. Thus signal No. 2 will be continued after passing a train control rail which is electrically conditioned in accordance with the second condition as hereinbefore described until the next train control rail is encountered.

Still speaking of the second condition of the train control rail, but assuming that switch S is in the right hand position, normal for a westbound train, alternating current relay 97 will be energized and polarized relay 99 will be negatively energized, thus leaving the armatures of the two relays in the same position as hereinbefore described under the second condition, but by reason of switch S being in the right hand position as shown in Fig. 5, a circuit through signal No. 1 is established instead of signal No. 2 as follows: from the positive pole of battery 100, wire 155, contact 172, polarized armature 110, wires 163, 139 and 162, signal No. 1, wire 161, terminal 127, pole member 113, hinge 117, wire 176, contact 175, polarized armature 107, wire 159, front contact 149, armature 105, wire 158, front contact 147, armature 103, wires 157 and 156, polarized armature 109, contact 173, wires 177 and 164, to the other pole of battery 100.

As the contact shoe 90 leaves the other end of the train control rail, the position of the armatures of relays 97 and 99 are maintained in the same position, since the two stick circuits, the alternating current stick circuit and the negative polarized relay stick circuit as hereinbefore described are still effective. Thus signal No. 1 is continued until the train control rail is encountered.

*Third condition.*—When switch S is in the left hand position, normal for an eastbound train movement, and the locomotive is passing a train control rail which is energized with positive direct current only no current will flow through alternating current relay 97 and its armatures 102 and 103 will break the front contacts 146 and 147 and armature 103 will make contact with back contact 178. Polarized relay 99, however, and polarized armatures will be the same as hereinbefore described, thus closing a circuit through signal No. 3 as follows: from the positive pole of battery 100, wire 155, contact 153, armature 109, wires 156 and 157, armature 103, back contact 178, wire 179, armature 106, front contact 150, wire 180, armature 108, contact 152, wire 181, hinge 120, pole member 116, terminal 126, wires 134, 129 and 182, signal No. 3, wires 162, 139 and 163, armature 110, contact 154, and wire 164, to the other pole of battery 100.

As the contact shoe 90 leaves the other end of the train control rails the position of armatures of relays 97 and 99 are maintained in the same position. The alternating current relay stick circuit is again closed at contacts 93 and 94 but this stick circuit is now open at front contact 146, thus leaving armatures 102 and 103 in the deenergizing position, but the positive polarized relay stick circuit is effective as hereinbefore described. Thus signal No. 3 is continued until the next train control rail is encountered.

Still speaking of the third condition of the train control rails but assuming that switch S is in the right hand position, normal for a westbound train, the armatures of relay 97 and 99 are still in the same position as under the third condition, but by reason of switch S being in the right hand position as shown in Fig. 5, a circuit through signal No. 4 is established as follows: from positive pole of battery 100, wire 155, contact 153, polarized armature 109, wires 156 and 157, armature 103, back contact 178, wire 179, armature 106, front contact 150, wire 180, polarized armature 108, contact 152, wire 181, hinge 120, pole member 116, terminal 130, wire 183, signal No. 4, wires 162, 139 and 163, polarized armature 110, contact 154, and wire 164 to the opposite pole of battery 100.

As the contact shoe 90 leaves the other end of the train control rail, the position of the armatures of relays 97 and 99 are maintained in the same position since the two stick circuits, the alternating current relay stick circuit and the positive polarized relay stick circuit as hereinbefore described are still effective, thus signal No. 4 is continued until the next train control rail is encountered.

*Fourth condition.*—When switch S is in the left hand position, normal for an eastbound train movement, and the locomotive is passing a train control rail which is energized with negative direct current only, no current will flow through alternating current relay 97 and its armatures 102 and 103 will break the front contacts 146 and 147 and armature 103 will make contact with back contact 178. Polarized relay 99, however, will be negatively energized and the position of its neutral and polarized armatures will be the same as hereinbefore described, thus closing the circuit through signal No. 4 as follows: from positive pole of battery 100, wire 155, contact 172, polarized armature 110, wires 163, 139 and 162, signal No. 4, wire 183, terminal 130, wire 133, terminal 125, pole member 115, hinge 119, wire 184, contact 174, polarized armature 108, wire 180, front contact 150, armature 106, wire 179, back contact 178, armature 103, wires 157 and 156, polarized armature 109, contact 173, wires 177 and 164, to the other pole of battery 100.

As the contact 90 leaves the other end of the train control rail the position of armatures of relays 97 and 99 are maintained in the same position. The alternating current relay stick circuit is again closed at contacts 93 and 94 but this stick circuit is now open at front contact 146, thus leaving armatures 102 and 103 in the deenergized position, but the negative polarized relay stick circuit is still effective as hereinbefore described. Thus signal No. 4 is continued until the next train control rail is encountered.

Still speaking of the fourth condition of the train control rail, but assuming that switch S is in the right hand position, normal for a westbound movement, the armatures of relays 97 and 99 are still in the same position as under the fourth condition but by reason of switch S being in the right hand position as shown in Fig. 5 a circuit through signal No. 3 is established as follows: from positive pole of battery 100, wire 155, contact 172, polarized armature 110, wires 163, 139 and 162, signal No. 3, wire 182, terminal 129, pole member 115, hinge 119, wire 184, contact 174, polarized armature 108, wire 180, front contact 150, armature 106, wire 179, back contact 178, armature 103, wires 157 and 156, polarized armature 109, contact 173, wires 177 and 164, to the other pole of battery 100.

As the contact shoe leaves the other end of train control rail the position of the armatures of relays 97 and 99 are maintained in the same position since the two stick circuits, the alternating current relay stick circuit is inoperative, and the negative polarized relay stick circuit as hereinbefore described, is operative. Thus signal No. 3 is continued until the next train control rail is encountered.

*Fifth condition.*—Irrespective of whether switch S is in the left hand position and a locomotive is passing a train control rail which is energized with alternating current only, alternating current relay 97 will be energized and its armatures 102 and 103 will contact with front contacts 146 and 147. Polarized relay 99, however, will be deenergized and neutral armatures 104, 105 and 106 drop away and armatures 105 and 106 make contact with back contact 185 and 186. This position of the several armatures establishes signal through signal No. 5 as follows: positive pole of battery 100, wire 155, contact 153, polarized armature 109, wires 156 and 157, armature 103, front contact 147, wire 158, armature 105, back contact 185, wire 187, signal No. 5, wires 162, 139 and 163, polarized armature 110, contact 154, wire 164, to the other pole of battery 100.

As the contact shoe leaves the other end of train control rail the stick circuit through relay 97 is operative since the front contact 147 is now closed, but the stick circuit through relay 99 is inoperative since the front contact 148 is now open. Thus signal No. 5 is continued until the next train control rail is encountered.

*Sixth condition.*—Irrespective of whether switch S is in the left hand or the right hand position and the locomotive is passing a train control rail which is deenergized, the two stick circuits will be opened at contacts 92, 93 and 94, and both relays 97 and 99 will become deenergized. Armatures 102 and 103 of relay 97 will drop away from front contacts 146 and 147 and armature 103 will make contact with back contact 178; armatures 104, 105 and 106 of relay 99 will drop away from their respective front contacts 148 and 149 and 150 and armatures 105 and 106 will make contact with back contacts 185 and 186. This position of the several armatures will close a circuit through signal No. 6 as follows: from positive side of battery 100, wire 155, contact 153, polarized armature 109, wires 156 and 157, armature 103, back contact 178, wire 179, armature 106, back contact 186, wire 188, signal No. 6 wires 162, 139 and 163, armature 110, contact 154, and wire 164 to the other pole of battery 100.

As the contact shoe 90 leaves the other end of the train control rail stick circuits are now inoperative, since front contacts 146 and 148 are now broken. Thus signal No. 6 will be continued until the next train control rail is encountered.

It must be understood that each time the contact shoe 90 slides onto a train control rail, both stick circuits one through relay 98 and the other one through relay 99 are opened at contacts 92, 93 and 94 and therefore both relays 98 and 99 would become deenergized, resulting in the displaying of signal No. 6, unless energy of some character is furnished from the dispatcher's office, while contact shoe 90 is in contact with a train control rail.

I will now describe the interlocking features between switches 19, 19ª and 19ᵇ by means of segments 67. As hereinbefore stated, in order for an eastbound train to receive a clear or proceed signal, that is signal No. 1, at a train control rail, the train control rail must be energized with alternating current and positive direct current. This electrical condition of the train control rail can only be accomplished when switch 19 is transversely in the normal position as shown in Fig. 2, and radially in the right oblique position. In order for a westbound train to receive a clear or proceed signal, that is signal No. 1 at a train control rail, the train control rail must be energized with alternating current and negative direct current. This electrical condition of the train control rail can only be accomplished, when switch 19 is transversely in the normal position, as shown in Fig. 2, and radially in the left hand position.

Assume now, that two trains, an eastbound train and a westbound train, are approaching each other and that they are to meet at siding D. The dispatcher can give a proceed signal to the eastbound train at train control rails 17 and 18 of block B, by placing switch 19 transversely in the normal position, and radially in the right oblique position. He can also give a proceed signal to a westbound train at train control rails 13 and 14, or block F by placing switch 19ᵇ transversely in the normal position. and radially in the left oblique position. Before switch 19 can be placed in the right oblique position and switch 19ᵇ in the left oblique position, the interlocking segments 67 compel that switch 19ª, governing block D, must be placed in the vertical position. This will result in the train control rails guarding the approach to block D being deenergized, and when both the eastbound train and the westbound train approach block D, both will receive a stop signal or signal No. 6. However, the interlocking segments are effective as interlocking means, only when switch 19ª is transversely also in the normal position. The dispatcher may however, if he chooses, pull switch 19ª forward transversely to the position shown at 34, and when segments 67 on switch 19ª is past the plane of segment 67 on switches 19 and 19ᵇ. In this forward position of switch 19ª, it may again be radially turned to the lef or right oblique position. If it is turned to the right oblique position, the eastbound train approaching block D, will receive signal No. 3, thus advising the engineer to stop and to occupy the main track for the purpose of passing another train, but the westbound train approaching block D, will receive signal No. 4 thus advising the engineer, to stop and occupy the siding for the purpose of passing another train. If, however, switch 19ª, is transversely in the forward position and turned radially in the left oblique position, the eastbound train approaching block D will receive signal No. 4, thus advising the engineer to stop and to occupy the siding for the purpose of passing another train and the westbound train approaching block D will receive signal No. 3, thus advising the engineer to stop and occupy the main track for the purpose of passing another train.

Still assuming that switch 19 is in the right oblique position and 19ᵇ in the left oblique position, and both transversely in the normal position, the dispatcher may also place switch 19ª in the rearward position as shown in dotted lines at 35 and then radially turn it to either the left oblique position or the right oblique position and thus display signal No. 5 to the trains approaching block D.

It will thus be seen that when an eastbound train and a westbound train are approaching each other, signal No. 1 cannot be displayed at their meeting point but only a signal which means stop to one or the other with any desired additional information. That is the interlocking means accomplished through segments 67 are only effective against the display of a clear or No. 1 signal at the meeting point of two oppositely moving trains.

It will also be noted that key 36 acts as a lock against the transverse movement of shaft 20 when switch 19 is radially in an oblique position. This locking feature necessitates that when a switch, as 19, is moved transversely to any of its positions, the switch must first be placed in the vertical position.

I will now describe the recording apparatus in the dispatcher's office. A record sheet as 189 is suitably mounted and driven by a roller 190, which in turn is driven by a shaft 191. Shaft 191 receives motion through ratchet wheel 192. A pawl 193 is pivotally connected to armature 194 of electromagnet 195. Armature 194 is hinged at 196. When electromagnet 195 is periodically energized, motion is given to ratchet wheel 192 through pawl 193. A spring 197 normally pulls armature 194 to the right, when electromagnet 195 is not energized. The electro-magnet 195 is connected by wire 198 to a make-and-break device 199, which is periodically operated by clock 200. This may well be of the form shown in my prior Patent 1,203,146 granted October 21, 1916. When the make-and-break device is closed, the electromagnet 195 is energized through the following circuit: battery 201, wires 202 and 203, electro-magnet 195, wire 198, make-and-break device 199, wires 204 and 205 to the other side of battery 201. The make-and-break device 199 is operated by the clock say every five seconds, so as to give a slow and uniform movement to the record sheet 189 through ratchet wheel 192 and pawl 193.

The record sheet 189 is transversely divided into sections as 206, 207 and 208, each section representing a block along the track longitudinally, the record sheet is divided into time lines such as 1.00 A. M., each one of the lines representing a one minute interval Since the make-and-break device 199 is operated continuously, it will be seen that longitudinally the record sheet assumes a constantly changing position during the 23 hours of the day.

Adjacent to the record sheet 189 are located perforating magnets 209, 210, 211, 212 and 213, for each space representing a block on the record sheet. For the purpose of simplicity the wiring of perforating magnets for one block only is shown in Fig. 1, that not shown being identical with that shown. Pivotally attached to the armatures 243 of these perforating magnets are perforating needles 214 so positioned adjacent to the record sheet that when a perforating magnet is energized, a perforation is made upon the record sheet. There are five such perforating magnets for each block so positioned that transversely each perforating magnet perforates in a different position. The circuits to these perforating magnets are closed depending upon the position of the armatures of alternating current relay 56 and polarized relay 80 hereinbefore referred to.

When a locomotive is passing a train control rail which is energized with alternating current and positive direct current, relay 56 will become energized and its armature 215 will close front contact 216 and relay 80 will become positively energized and its neutral armatures 217 and 218 will close front contacts 219 and 220 and its polarized armatures 221 and 222 will assume the left hand position thus closing the contacts 223 and 224. In these positions of the several armatures a circuit is closed through perforating magnet 211 as follows: front battery 201, wire 202, bus 225, wire 227, perforating magnet 211, wire 227, contact 223, armature 221, wire 228, front contact 219, armature 217, wire 229, front contact 216, armature 215, bus 230, and wire 205 to the other side of battery 201. Thus a perforation is made in the record sheet at the time a locomotive passes a train control rail, which is energized with alternating current and positive direct current.

When a locomotive is passing a train control rail, which is energized with alternating current and negative direct current, relay 56 will become energized and its armature 215, will close front contact 216, and relay 80 will become negatively energized and its neutral armatures 217 and 218 will close front contacts 219 and 220, but its polarized armatures 221 and 222 will now assume the right hand position thus closing contacts 231 and 232. In these positions of the several armatures a circuit is closed through perforating magnet 212 as follows: from battery 201, wire 202, bus 225, wire 233, perforating magnet 212, wire 234, contact 231, armature 221, wire 228, front contact 219, armature 217, wire 229, front contact 216, armature 215, bus 230, wire 205 to the other side of battery 201. Thus a perforation is made in the record sheet by magnet 212 when a locomotive is passing a train control rail which is energized with alternating current and negative direct current.

When a locomotive is passing a train control rail which is energized with positive direct current only, relay 56 will become deenergized and its armature 215 will close back contact 235, and relay 80 will be positively energized and its neutral armatures 217 and 218 will close front contacts 219 and 220 and its polarized armatures 221 and 222 will assume the left hand position, thus closing the contacts 223 and 224. In these positions of the several armatures a circuit is closed through perforating magnet 209 as follows: from battery 201, wire 202, bus 225, wire 236, perforating magnet 209, wire 237, contact 224, armature 222, wire 238, front contact 220, armature 218, wire 239, back contact 235, armature 215, bus 230, and wire 205 to the other side of battery 201.

Thus a perforation is made in the record sheet by perforating magnet 209 as to the time a locomotive passed a train control rail which is energized with positive direct current only.

When a locomotive is passing a train control rail which is energized with negative direct current only, relay 56 will remain deenergized and armature 215 will close back contact 235, and relay 80 will be negatively energized and its neutral armature 221 and 222 will assume the right hand position thus closing the contacts 231 and 232. In these positions of the several armatures a circuit is closed through perforating magnet 210 as follows: from battery 201, wire 202, bus 225, wire 226, perforating magnet 210, wire 240, contact 232, armature 222, wire 238, front contact 220, armature 218, wire 239, back contact 235, armature 215, bus 230, and wire 205 to the other side of battery 201. Thus a perforation is made by magnet 210 in the record sheet as to the time a locomotive passed a train control rail which is energized with negative direct current only.

When a locomotive is passing a train control rail which is energized with alternating current only, relay 56 will become energized and its armature 215 will close front contact 216 and relay 80 will remain deenergized and its neutral armature 217 will make contact with back contact 241. In these positions of the several armatures a circuit is closed through perforating magnet 213 as follows: from battery 201, wire 202, bus 225, wire 233, perforating magnet 213, wire 242, back contact 241, armature 217, wire 229, front contact 216, armature 215, bus 230, and wire 205 to the other side of battery 201. Thus a perforation is made by magnet 213 in the record sheet as to the time a locomotive passed a train control rail which is energized with alternating current only.

It will thus be seen that every time a locomotive is passing a train control rail which is electrically energized in accordance with one of the first five hereinbefore enumerated conditions, not only is there a record made on the record sheet as to the time when the locomotive passed the train control rail, but also as to what kind of a signal was displayed on the locomotive. When a locomotive is passing a deenergized train control rail no record is made on the record sheet but the absence of such a record, is in itself, evidence when the locomotive has passed a deenergized train control rail.

The perforating magnets are preferably so constructed, that when the magnet is energized, the perforating needle is driven through the record sheet by a momentum, but the perforating needle will immediately withdraw from the record sheet, even if the armature of the perforating magnet, is not immediately released. A perforating magnet of this character is shown in my prior Patent No. 1,138,304, granted May 11, 1915.

While in the preferred form of my invention I have shown recording means to give the dispatcher knowledge of the location and progress of trains, I do not wish to be restricted to the recording means shown. Any means automatically indicating at the dispatcher's office the location and progress of trains may be considered an equivalent within the scope of my invention. For instance, the perforating magnets 209, 210, 211, 212 and 213 may be indication lamps which are lighted when their respective circuits are closed; thus visibly indicating the location and progress of trains. Or the perforating magnets 209, 210, 211, 212 and 213 may be any form of electrical translating devices which indicate when the circuits through them are closed; thus the position of armature 243, in itself may be a visible indication to the dispatcher of the location and progress of trains.

Although I have particularly described and illustrated one preferred physical embodiment of my invention and explained the principle and construction thereof, neverthless, I desire to have it understood that the form selected is merely illustrative, but does not exhaust the possible physical embodiment of means underlying my invention, because fixed signals along the trackway may be substituted for, or added to the cab signals as shown herein; such as are shown in my pending application Serial No. 618,193, filed February 10, 1923, without departing from the spirit and scope of my invention.

What is claimed is:

1. In a railway train control device, in combination a trackway, means dividing the trackway into electrically isolated sections, train control rails positioned at intervals along the trackway on opposite sides of the center line thereof, passing sidings positioned at intervals along the trackway, each siding having associated therewith a group of train control rails, a central station, switches at the central station, each controlling the electrical condition of a group of train control rails, a car, means on the car cooperating with the train control rails for controlling the car according to any one of six different electrical conditions of said rails provided for by different operations of said switches, means causing said switches to have a mutual dependence, and track relay means for each section rendered automatically operative by the presence of a car in that section for causing a single definite electrical condition of the corresponding train control rails, regardless of the setting of the corresponding central station switch.

2. In a railway train control device, in combination a trackway, means dividing the trackway into electrically isolated sections, train control rails positioned at intervals along the trackway on opposite sides of the center line thereof, passing siding positioned at intervals along the trackway, each siding having associated therewith a group of train control rails, a central station, switches at the central station, each controlling the electrical condition of a group of train control rails, a car, means on the car cooperating with the train control rails for indicating any one of six different train control conditions, means causing said switches to have a mutual dependence, means for recording at the central station the progress of the car, and track relay means for each section rendered automatically operative by the presence of a car in that section for causing a single definite electrical condition of the corresponding train control rails, regardless of the setting of the corresponding central station switch, said single definite electrical condition being one of the six conditions to which said means on the car is responsive.

3. In a railway train control device, in combination a trackway, means dividing the trackway into electrically isolated sections, train control rails positioned at intervals along the trackway on opposite sides of the center line thereof; passing sidings positioned at intervals along the trackway, each siding having associated therewith a group of train control rails, a central station, switches at the central station, each controlling the electrical condition of a group of train control rails and in combination with sources of current providing selectively for six different electrical conditions of said train control rails, a car, means on the car cooperating with the train control rails for indicating any one of the six different train control conditions as established by said switches, said means including an element for selecting the indications in accordance with the direction of movement of the car whereby the indications on a car proceeding in one direction produced by certain conditions of the train control rails will be different from the indications on a car proceeding in the opposite direction produced by the same conditions of the control rails, and track relay means for each section rendered automatically operative by the presence of a car in that section for causing a single definite electrical condition of the corresponding train control rails, regardless of the setting of the corresponding central station switch, said single definite electrical condition being one of the six conditions to which said means on the car is responsive.

4. In a railway train control device, in combination a trackway, means dividing the trackway into electrically isolated sections, train control means positioned at intervals along the trackway on opposite sides of the center line thereof, passing sidings positioned at intervals along the trackway, each siding having associated therewith a group of train control means, a central station, switches at the central station, each controlling the electrical condition of a group of train control means and in combination with sources of current providing selectively for six different operative phases of said train control means, means for differentiating the operative phases of said train control means as between vehicles moving in opposite directions on the trackway and as produced by similar selections of current, and track relay means for each section rendered automatically operative by the presence of a car in that section for causing a single definite operative phase of the corresponding train control means, regardless of the setting of the corresponding central station switch, said single definite operative phase being one of the six operative phases provided for by the operation of each of said central station switches.

5. In a railway train control device, in combination a trackway, means dividing the trackway into electrically isolated sections, train control means positioned at intervals along the trackway on opposite sides of the center line thereof, passing sidings positioned at intervals along the trackway, each siding having associated therewith a group of train control means, a central station, switches at the central station, each controlling the electrical condition of a group of train control means, a car, means on the car cooperating with the train control means for controlling the car according to any one of more than three electrical conditions of said means provided for by different operations of said switches, means causing said switches to have a mutual dependence, and track relay means for each section rendered automatically operative by the presence of a car in that section for causing a single definite electrical condition of the corresponding train control means regardless of the setting of the corresponding central station switch.

6. In a railway train control device, in combination a trackway, means dividing the trackway into electrically isolated sections, train control means positioned at intervals along the trackway on opposite sides of the center line thereof, passing sidings positioned at intervals along the trackway, each siding having associated therewith a group of train control means, a central station, switches at the central station, each controlling the electrical condition of a group of train control means, a car, means on the car cooperating with the train control means for indicating any one of more than three train control conditions, means causing said switches to have a mutual dependence, means for recording at the central station the progress of the car, and track relay means for each section rendered automatically operative by the presence of a car in that section for causing a single definite electrical condition of the corresponding train control means regardless of the setting of the corresponding central station switch, said single definite electrical condition being one of the several conditions to which said means on the car is responsive, 7. In a railway train control device, in combination a trackway, means dividing the trackway into electrically isolated sections, train control means positioned at intervals along the trackway on opposite sides of the center line thereof, passing sidings positioned at intervals along the trackway, each siding having associated therewith a group of train control means, a central station, switches at the central station, each controlling the electrical condition of a group of train control means and in combination with sources of current providing selectively for more than three different electrical conditions of said train control means, a car, means on the car cooperating with the train control means for indicating any one of the several different train control conditions as established by said switches, said means including an element for selecting the indications in accordance with the direction of movement of the car whereby the indications on a car proceeding in one direction produced by certain conditions of the train control means will be different from the indications on a car proceeding in the opposite direction produced by the same conditions of the control means, and track relay means for each section rendered automatically operative by the presence of a car in that section for causing a single definite electrical condition of the corresponding train control means regardless of the setting of the corresponding central station switch, said single definite electrical condition being one of the several conditions to which said means on the car is responsive.

8. In a railway train control device, in combination a trackway, means dividing the trackway into electrically isolated sections, train control means positioned at intervals along the trackway on opposite sides of the center line thereof, passing sidings positioned at intervals along the trackway, each siding having associated therewith a group of train control means, a central station, switches at the central station, each controlling the electrical condition of a group of train control means and in combination with sources of current providing selectively for more than three different operative phases of said train control means, means for differentiating the operative phases of said train control means as between vehicles moving in opposite directions on the trackway and as produced by similar selections of current, and track relay means for each section rendered automatically operative by the presence of a car in that section for causing a single definite operative phase of the corresponding train control means, regardless of the setting of the corresponding central station switch, said single definite operative phase being one of the several operative phases provided for by the operation of each of said central station switches.

9. In a railway train control and dispatching system, a central office, a single track divided into sections or blocks by sidings or cross-overs, a track circuit for each block, a signal system controlled from said office for the governing of train movements over said sections providing signal protection for either direction of train movements, means for actuating more than three signals for the transmission of information to a train moving in either one or the other direction over said single track, a switch controlling an electrical circuit at a central office for selecting means for displaying any one of said signals, said switch when in one position giving a proceed signal to a train moving in one direction over a section and at the same time preventing giving a proceed signal to a train moving over the same section in the opposite direction, track circuit means for also controlling said signals, and means for indicating at the central office when a train enters a certain section.

10. In a train control and dispatching system for railways, a series of single track sections divided into blocks, a track circuit for each block, passing sidings at intervals along said trackway to permit the passage of trains, trains for operating in either direction over the single track sections, means for actuating more than three signals for governing the movements of a train for one direction, the proceed signal being given by a certain kind of current, means for actuating more than three signals for governing the movement of a train for the other direction, the proceed signal being given by a different kind of current, and two means for controlling the signals, one means being manually operated at a central office, the other means being automatically operated by a track circuit.

11. In a train control and dispatching system for railways, a series of single track sections divided into blocks, a track circuit for each block, passing sidings at intervals along said trackway to permit the passage of trains, trains for operating in either direction over the single track sections, means for actuating more than three signals for governing the movements of a train for one direction, the proceed signal being given by a certain kind of current, means for actuating more than three signals for governing the movement of a train for the other direction, the proceed signal being given by a different kind of current, a central office, a dispatching circuit between said central office and each section, and two means each including said dispatching circuit for controlling the signals, one means being manually operated at said central office and the other means being automatically operated by a track circuit.

12. In a train control and dispatching system for railways, a series of single track sections divided into blocks, a track circuit for each block, passing sidings at intervals along said trackway to permit the passage of trains, trains for operating in either direction over the single track sections, means for actuating more than three signals for governing the movements of a train for one direction, the proceed signal being given by a certain kind of current, more than three signals for governing the movement of trains for the other direction, the proceed signal being given by a different kind of current, and two means for controlling the signals, one means being manually operated at a central office, the other means being automatically operated by a track circuit, and means including said track circuit for indicating at said central office the location of a train in relation to a track section.

13. In a train control and dispatching system for railways, a series of single track sections divided into blocks, a track circuit for each block, passing sidings at intervals along said trackway to permit the passage of trains, trains for operating in either direction over the single track sections, more than three signals for governing the movements of trains for one direction, the proceed signal being given by a certain kind of current, means for actuating more than three signals for governing the movement of a train for the other direction, the proceed signal being given by a different kind of current, a central office, a dispatching circuit between said central office and each section, and two means each including said dispatching circuit for controlling the signals, one means being manually operated at said central office and the other means being automatically operated by a track circuit, and means including said track circuit and said dispatching circuit for indicating at said central office the location of a train.

14. In a train control and dispatching system for single track railways over which trains operate in either direction, a trackway divided into blocks, a track circuit for each block, passing sidings at intervals along said trackway to permit the passage of trains, said sidings dividing the trackway into sections, means for actuating more than three signals including proceed and stop signals for both directions of train operation, the proceed signal for one direction being given by one kind of current and the proceed signal for the other direction being given by another kind of current, a central office, circuit means for each section manually operated at the central office for controlling the signal actuating means, and track circuit controlled means interconnected with said central office circuit means whereby when a train going in one direction has entered a single track section the signal at the other end of said section for the other direction of train operation indicates stop.

15. In a train control and dispatching system for single track railways over which trains operate in either direction, a trackway divided into blocks, a track circuit for each block, passing sidings at intervals along said trackway to permit the passage of trains, said sidings dividing the trackway into sections, means for actuating more than three signals including proceed and stop signals for both directions of train operation, the proceed signal for one direction being given by one kind of current and the proceed signal for the other direction being given by another kind of current, a central office, a dispatching circuit between said central office and each section, circuit means for each section manually operated at the central office for controlling the signal actuating means and track circuit controlled means interconnected with said dispatching circuit whereby when a train going in one direction has entered a single track section the signal at the other end of the section for the other direction of train operation indicates stop.

16. In a train control and dispatching system for single track railways over which trains operate in either direction, a trackway divided into blocks, a track circuit for each block, passing sidings at intervals along said trackway to permit the passage of trains, said sidings dividing the trackway into sections, means for actuating more than three signals including proceed and stop signals for both directions of train operation, the proceed signal for one direction being given by one kind of current and the proceed signal for the other direction being given by another kind of current, a central office, circuit means for each section manually operated at the central office for controlling the signal actuating means and track circuit controlled means interconnected with said signal actuating means whereby when a train going in one direction has entered a single track section the signal at the other end of the section for the other direction of train operation indicates stop, and means including said track circuit for indicating at said central office the location of a train.

17. In a train control and dispatching system for single track railways over which trains operate in either direction, a trackway divided into blocks, a track circuit for each block, passing sidings at intervals along said railway to permit the passage of trains, said sidings dividing the railway into sections, means for actuating more than three signals including proceed and stop signals for both directions of train operation, the proceed signal for one direction being given by one kind of current and the proceed signal for the other direction being given by another kind of current, a central office, circuit means for each section manually operated at the central office for controlling the signal actuating means and track circuit controlled means interconnecting with said central office circuit means whereby when a train going in one direction has entered a single track section the signal at the other end of the section for the other direction of train operation indicates stop, and means including said track circuit for indicating at said central office the location of a train in relation to a track section.

18. In a train control and dispatching system for single track railways over which trains operate in either direction, a trackway divided into blocks, a track circuit for each block, passing sidings at intervals along said railway to permit the passage of trains, said sidings dividing the railway into sections, means for actuating more than three signals including proceed and stop signals for both directions of train operation, the proceed signal for one direction being given by one kind of current and the proceed signal for the other direction being given by another kind of current, a central office, a dispatching circuit between said central office and each section, circuit means for each section manually operated at the central office for controlling the signal actuating means and track circuit controlled means interconnecting with said central office circuit whereby when a train going in one direction has entered a single track section the signal at the other end of the section for the other direction of train operation indicates stop, and means including said track circuit and said dispatching circuit for indicating at said central office the location of a train.

19. In a train control and dispatching system for single track railways over which trains operate in either direction, a plurality of single track sections divided into blocks, a track circuit for each block, passing sidings at intervals along said single track to permit the passage of trains, means for actuating more than three signals indicating proceed, stop and at least two other signals for governing the movements of a train for either direction, the proceed signal for one direction being controlled by one kind of current and the proceed signal for the other direction being controlled by another kind of current, said signal actuating means providing rear end protection from block to block and also providing head on protection for the single track sections and two means for controlling the signal actuating means, one means being manually operated at a central office and the other means being automatically operated by a track circuit.

20. In a train control and dispatching system for single track railways over which trains operate in either direction, a plurality of single track sections divided into blocks, a track circuit for each block, passing sidings at intervals along said single track to permit the passage of trains, means for actuating more than three signals indicating proceed, stop and four other signals for governing the movements of a train for either direction, the proceed signal for one direction being controlled by one kind of current and the proceed signal for the other direction being controlled by another kind of current, said signal actuating means providing rear end protection from block to block and also providing head on protection for the single track sections, a central office, a dispatching circuit between said central office and each section, and two means each including said dispatching circuit for controlling the signal actuating means, one means being manually operated at said central office and the other means being automatically operated by a track circuit.

21. In a train control and dispatching syster for single track railways over which trains operate in either direction, a plurality of single track sections divided into blocks, a track circuit for each block, passing sidings at intervals along said single track to permit the passage of trains, means for actuating more than three signals indicating proceed, stop and at least two other signals for governing the movements of a train for either direction, the proceed signal for one direction being controlled by one kind of current and the proceed signal for the other direction being controlled by another kind of current, said signal actuating means providing rear end protection from block to block and also providing head on protection for the single track sections and two means for controlling the signal actuating means, one means being manually operated at a central office and the other means being automatically operated by a track circuit, and means including said track circuit for indicating at said central office the location of a train.

22. In a train control and dispatching system for single track railways over which trains operate in either direction, a plurality of single track sections divided into blocks, a track circuit for each block, passing sidings at intervals along said single track to permit the passage of trains, means actuating more than three signals indicating proceed, stop and at least two other signals for governing the movements of trains for either direction, the proceed signal for one direction being controlled by one kind of current and the proceed signal for the other direction being controlled by another kind of current, said signal actuating means providing rear end protection from block to block and also providing head on protection for the single track sections and two means for controlling the signal actuating means, one means being manually operated at a central office and the other means being automatically operated by a track circuit, and means including said track circuit for indicating at said central office the location of a train in relation to a track section.

23. In a train control and dispatching system for single track railways over which trains operate in either direction, a plurality of single track sections divided into blocks, a track circuit for each block, passing sidings at intervals along said single track to permit the passage of trains, means actuating more than three signals indicating proceed, stop and at least two other signals for governing the movements of trains for either direction, the proceed signal for one direction being controlled by one kind of current and the proceed signal for the other direction being controlled by another kind of current, said signal actuating means providing rear end protection from block to block and also providing head on protection for the single track sections, a central office, a dispatching circuit between said central office and each section, and two means each including said dispatching circuit for controlling the signal actuating means, one means being manually operated at said central office and the other means being automatically operated by a track circuit.

24. In a train control and dispatching system for railways, a series of single track sections divided into blocks, a track circuit for each block, passing sidings at intervals along said trackway to permit the passage of trains, trains for operating in either direction over the single track sections, means for actuating more than three signals on the train for governing the movements of the train for either direction of train operation, the proceed signal for a train moving in one direction being controlled by a certain kind of current and the proceed signal for a train moving in an opposite direction being controlled by another kind of current, and two means for controlling the signal actuating means, one means being manually operated at a central office and the other means being automatically operated by a track circuit.

25. In a train control and dispatching system for railways, a series of single track sections divided into blocks, a track circuit for each block, passing sidings at intervals along said trackway to permit the passage of trains, trains for operating in either direction over the single track sections, means for actuating more than three signals for governing the movements of a train for one direction, the proceed signal being given by a certain kind of current, means for actuating more than three signals for governing the movement of a train for the other direction, the proceed signal being given by a different kind of current, a central office, a dispatching circuit between said central office and each section, and two means each including said dispatching circuit for controlling the signal actuating means, one means being manually operated at said central office and the other means being automatically operated by a track circuit, said manually operated means at the central office being interlocked as between sections to prevent giving a proceed signal in more than one direction over the section.

26. A train control and dispatching system for a single track railway over which trains operate in either direction comprising a trackway divided into blocks, means adjacent each block for transmitting electric current for controlling more than three signals conveying information to a train proceeding in one direction, a second means adjacent each block for transmitting electric current for controlling more than three signals conveying information to a train proceeding in the other direction, a central office, sources of electric currents at the central office of specifically different characteristics, a circuit for producing said currents from the central office to said current transmitting means, a switch at the central office for selectively supplying a given current to the circuit, a track circuit including a track relay for each block, said central office circuit for any block being controlled by and extending through an armature of the track relay of an adjacent block.

PAUL J. SIMMEN.

CERTIFICATE OF CORRECTION.

Reissue Patent No. 17,395. Granted August 6, 1929, to

PAUL J. SIMMEN.

It is hereby certified that error appears in the printed specification of the above numbered patent requiring correction as follows: Page 14, line 7, claim 12, before the word "more" insert the words "means for actuating", and line 8, for the word "trains" read "a train"; same page, line 24, claim 13, before the word "more" insert the words "means for actuating", and line 26, for "trains" read "a train"; page 16, line 82, claim 26, for the word "producing" read "conducting"; and that the said Letters Patent should be read with these corrections therein that the same may conform to the record of the case in the Patent Office.

Signed and sealed this 10th day of September, A. D. 1929.

M. J. Moore,
Acting Commissioner of Patents.

(Seal)